United States Patent
Wilhelmsson et al.

(10) Patent No.: US 8,576,869 B2
(45) Date of Patent: Nov. 5, 2013

(54) SIMULTANEOUS CELL GROUP AND CYCLIC PREFIX DETECTION METHOD, APPARATUS AND SYSTEM

(75) Inventors: Leif Wilhelmsson, Dalby (SE); Bengt Lindoff, Bjärred (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 171 days.

(21) Appl. No.: 12/970,306

(22) Filed: Dec. 16, 2010

(65) Prior Publication Data

US 2011/0090995 A1  Apr. 21, 2011

Related U.S. Application Data

(63) Continuation of application No. 11/961,603, filed on Dec. 2, 2007, now abandoned.

(60) Provisional application No. 60/945,399, filed on Jun. 21, 2007.

(51) Int. Cl.
*H04Q 11/02* (2006.01)

(52) U.S. Cl.
USPC ........................................ 370/430

(58) Field of Classification Search
USPC .................. 370/208, 338, 350, 430
See application file for complete search history.

(56) References Cited

U.S. PATENT DOCUMENTS

2004/0246890 A1* 12/2004 Marchok et al. .............. 370/210
2007/0270273 A1* 11/2007 Fukuta et al. ................. 475/206
2009/0131037 A1*  5/2009 Malladi et al. ............. 455/422.1

OTHER PUBLICATIONS

U.S. Appl. No. 11/961,603, Dec. 25, 2008, All Documents Cited in Parent Application.

* cited by examiner

*Primary Examiner* — Dang Ton
*Assistant Examiner* — Nourali Mansoury (57) ABSTRACT

A method, and associated apparatus and system, for simultaneous cell group and cyclic prefix (CP) detection, having the steps of determining primary synchronization signal (P-SyS) timing τ using the P-SyS; based on τ, determine a secondary synchronization signal (S-SyS) timing; placing a single Fast Fourier Transform (FFT) window; FFT processing the signal to obtain the frequency domain S-SyS symbols; equalizing the frequency domain S-SyS signal; phase correcting the S-SyS signal; and detecting the cell group and CP length by the correlation giving maximum energy.

4 Claims, 6 Drawing Sheets

Figure 4: Flow chart according to invention 400

SIMULTANEOUS CELL GROUP AND CYCLIC PREFIX DETECTION METHOD, APPARATUS AND SYSTEM

CROSS-REFERENCE TO RELATED APPLICATIONS

This application claims the benefit of U.S. Provisional Application No. 60/945,399, filed Jun. 21, 2007, and is a continuation of U.S. patent application Ser. No. 11/961,603, filed Dec. 2, 2007, now abandoned, the disclosures of which are incorporated herein by reference.

TECHNICAL FIELD

The present invention relates generally to communication systems and components and, more particularly, to wireless communication systems an components adapted to use Orthogonal Frequency Division Multiplexing (OFDM) modulation techniques.

BACKGROUND

Evolving mobile cellular standards such as Global System for Mobile Communications (GSM) and Wideband Code Division Multiple Access (WCDMA) will likely require modulation techniques such as OFDM in order to deliver higher data rates. OFDM is a method for multiplexing signals which divides the available bandwidth (BW) into a series of frequencies known as sub-carriers.

In order to ensure a smooth migration from existing cellular systems to high capacity, high data rate systems using existing radio spectrum, new systems must be able to operate on a flexible BW. Third generation Long Term Evolution (LTE) has been proposed as a new flexible cellular system. LTE is intended as an evolution of the WCDMA standard. LTE will likely use OFDM and operate on BWs spanning from 1.25 MHz to 20 MHz. Data rates of up to 100 Mb/s will be possible in the high BW LTE service.

Low rate services such as voice are also expected to use LTE. Because LTE is designed for Transmission Control Protocol/Internet Protocol (TCP/IP), voice over IP (VoIP) will likely be the service carrying speech.

One important aspect of LTE is the mobility function. As a result, synchronization symbols and cell search procedures are of major importance in order for an apparatus, such as a user equipment (UE), to detect and synchronize with other cells.

Figure 1:
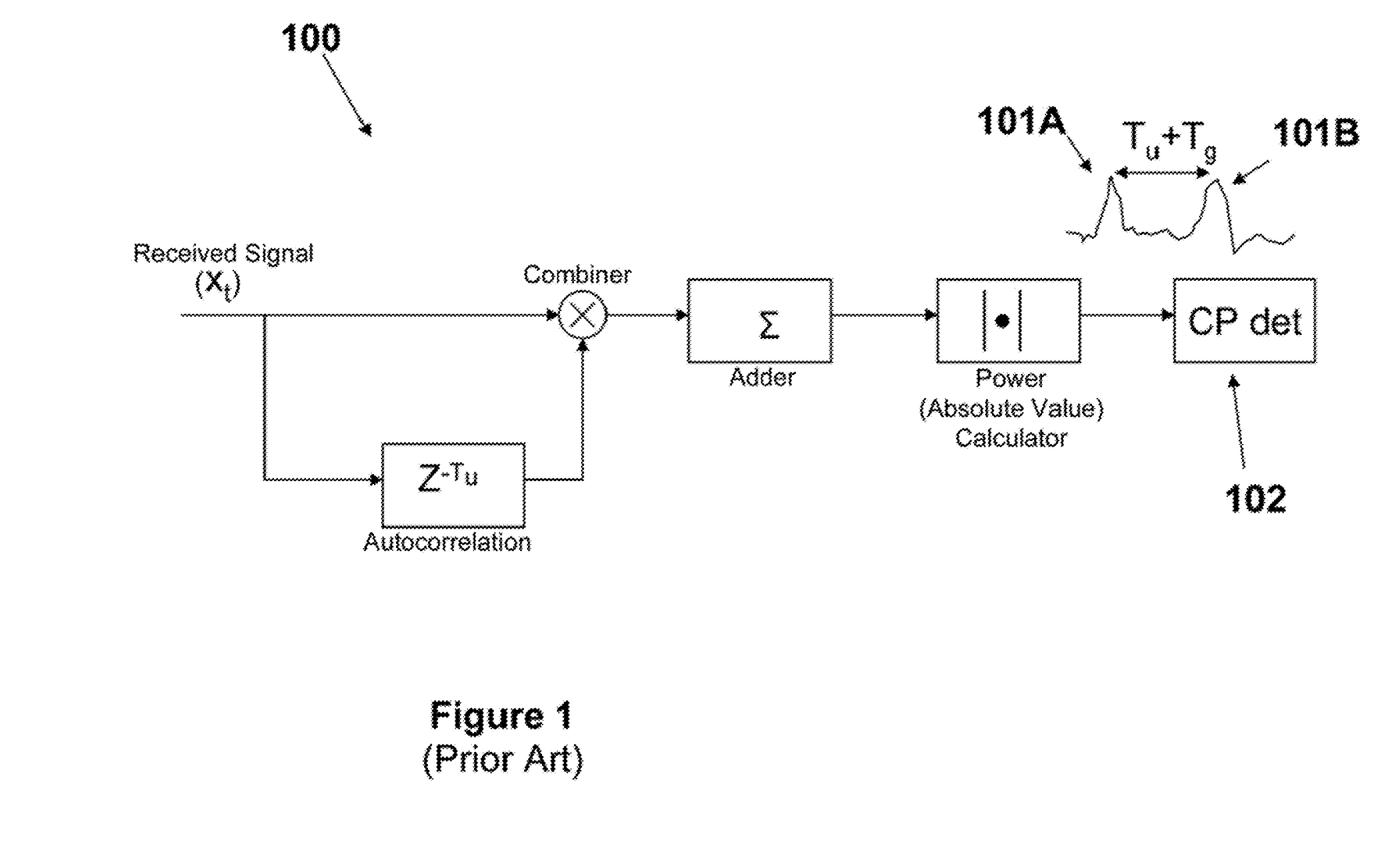
FIG. 1 illustrates a block diagram for performing blind CP detection in the time domain.

The proposed cell search scheme for LTE is as follows:

1. Detect symbol timing for new cell using the primary synchronization signal (P-SyS). Furthermore, because there are three P-SyS, the UE also detects which of the P-SyS have been transmitted from the cell. The index of each P-SyS identifies the cell ID within a group. P-SyS is transmitted every 5 milliseconds (ms).
2. Detect frame timing and cell group using the secondary synchronization signal (S-SyS). The frequency domain representation of P-SyS is used as phase reference and then the S-SyS detection (correlation to different S-SyS sequences) is performed in the frequency domain.
3. From steps (1) and (2), the cell ID is detected.
4. Read broadcast channel (BCH) to receive cell specific system information In LTE, there will be a possibility of using a short cyclic prefic (CP) or a long CP length. The short CP length (4.7 microseconds (μsec)) will be used for small cells and the long CP length (16.7 μsec) will be used for large cells and broadcast services. The intention is that the UE should detect the cell specific CP length blindly. This is preferably performed prior to detecting the frame timing and cell group using the secondary S-SyS (step 2 of the cell search scheme described above). Blind CP detection can be made in the time domain, as seen in the block diagram 100 of FIG. 1. In this case, the UE performs autocorrelation of the received signal with distance $T_u$ corresponding to the OFDM symbol length. The correlation is summed and the power (absolute value) is calculated. Peaks 101A, 101B will arrive with a distance of $T_u+T_g$ where $T_g$ is the CP length. From that, the CP length can be computed at module 102. This time-domain approach is suitable for a single frequency, synchronized, network, such as digital video broadcasting-handheld (DVB-H), where signals from all cells are transmitted with the same CP length and are synchronized. However, this will typically not be the case in LTE. In LTE the cells can be operated in a asynchronus mode and different cells might have different CP lengths. This, in turn, will result in a risk of multiple correlation peaks making the time domain CP length detection much more complicated.

Figure 2:
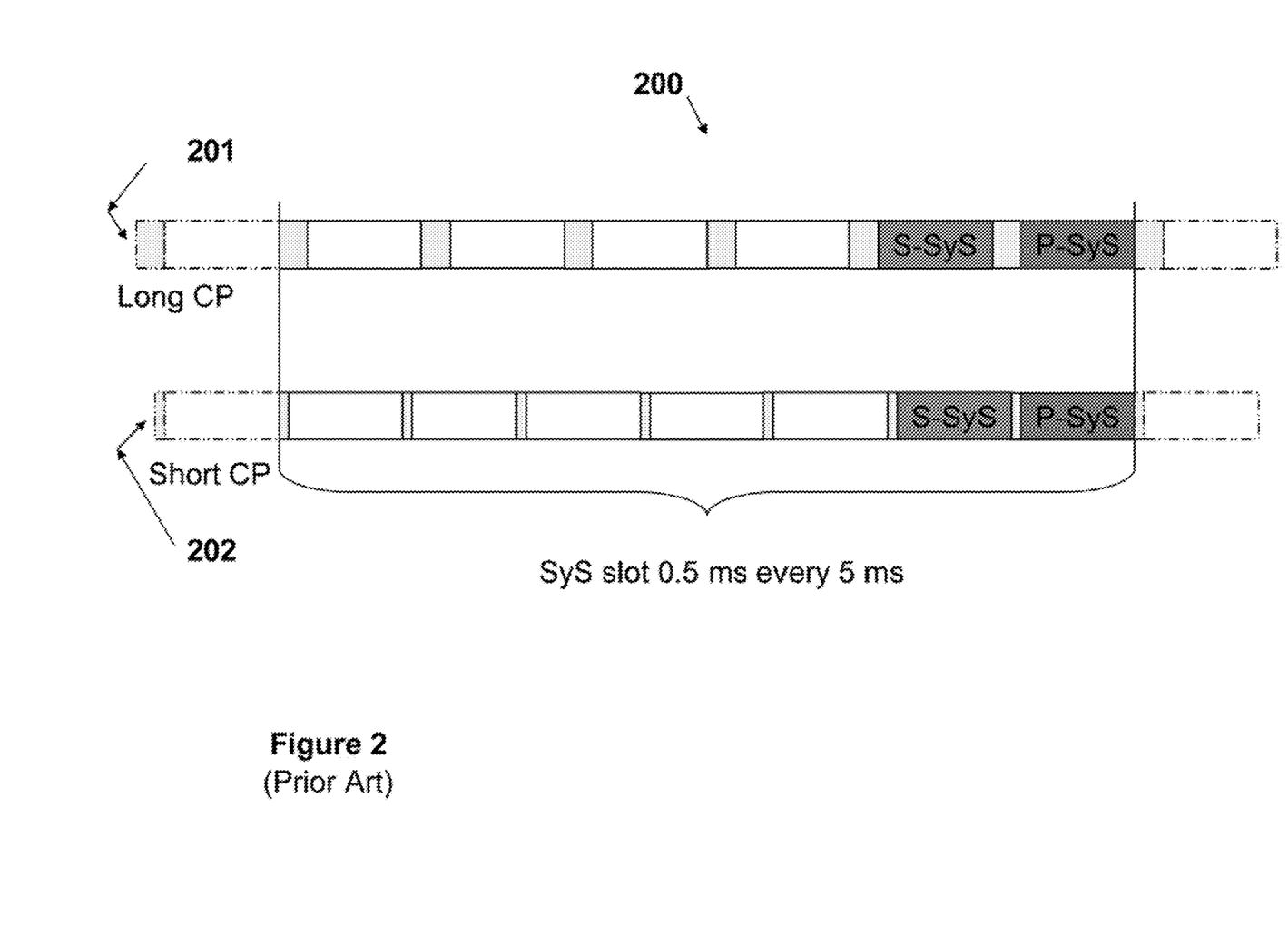
FIG. 2 illustrates the synchronization signal (SyS) structure in LTE, for the long CP and short CP case.

FIG. 2 shows the synchronization signal (SyS) structure 200 in LTE, for both the long CP 201 and short CP 202 case. A slot with a length of 0.5 ms in LTE consists of 7 OFDM symbols in the short CP case and 6 OFDM symbols in the long CP case. Every 10th slot, that is every 5 ms, the SyS is transmitted. For frequency division duplex (FDD) (full duplex) in LTE, P-SyS is transmitted in the last OFDM symbol in the slot and the S-SyS in the second to last OFDM symbol. For time division duplex (TDD), the S-SyS is transmitted in the last OFDM symbol and P-SyS is transmitted in the first OFDM symbol in the next slot.

It would be advantageous to have a low complexity blind CP detection method and apparatus that is robust also in scenarios existing in OFDM cellular system like LTE. The present invention provides such a method and apparatus.

SUMMARY

The present invention is a method, apparatus and system to simultaneously determine the CP length and the cell group during the cell search step of detecting the frame timing and cell group using the S-SyS in a wireless telecommunications system.

DETAILED DESCRIPTION

The present invention is a method to simultaneously determine the CP length and the cell group during the cell search when detecting the frame timing and cell group using the S-SyS by time adjusting the Fast Fourier Transform (FFT)

window for the S-SyS. The present invention further includes an apparatus and system adapted to implement said method.

When the P-SyS 5 ms timing is detected, the timing for S-SyS can be computed for both for the long CP and short CP length case, that is, the placement of the FFT window for both cases can be determined. In the present invention, the FFT window for S-SyS is set between the estimated timing for the long CP and short CP. Then, the channel in the frequency domain is positive phase shifted for the long CP length and negative phase shifted for the short CP relative the channel determined by the P-SyS. Therefore, prior to the correlation to the S-SyS sequences, the received frequency domain transformed S-SyS signal is positive and negative phase corrected and the S-SyS sequences are correlated to both corrected signals. The SyS sequence and correction giving maximum energy is detected as the cell group and the length of CP. As noted, the CP can be detected in the frequency domain, avoiding the multiple peak problem of the conventional method, while advantageously using only one FFT processing. Hence the method of the present invention is robust and has low complexity.

Figure 3:
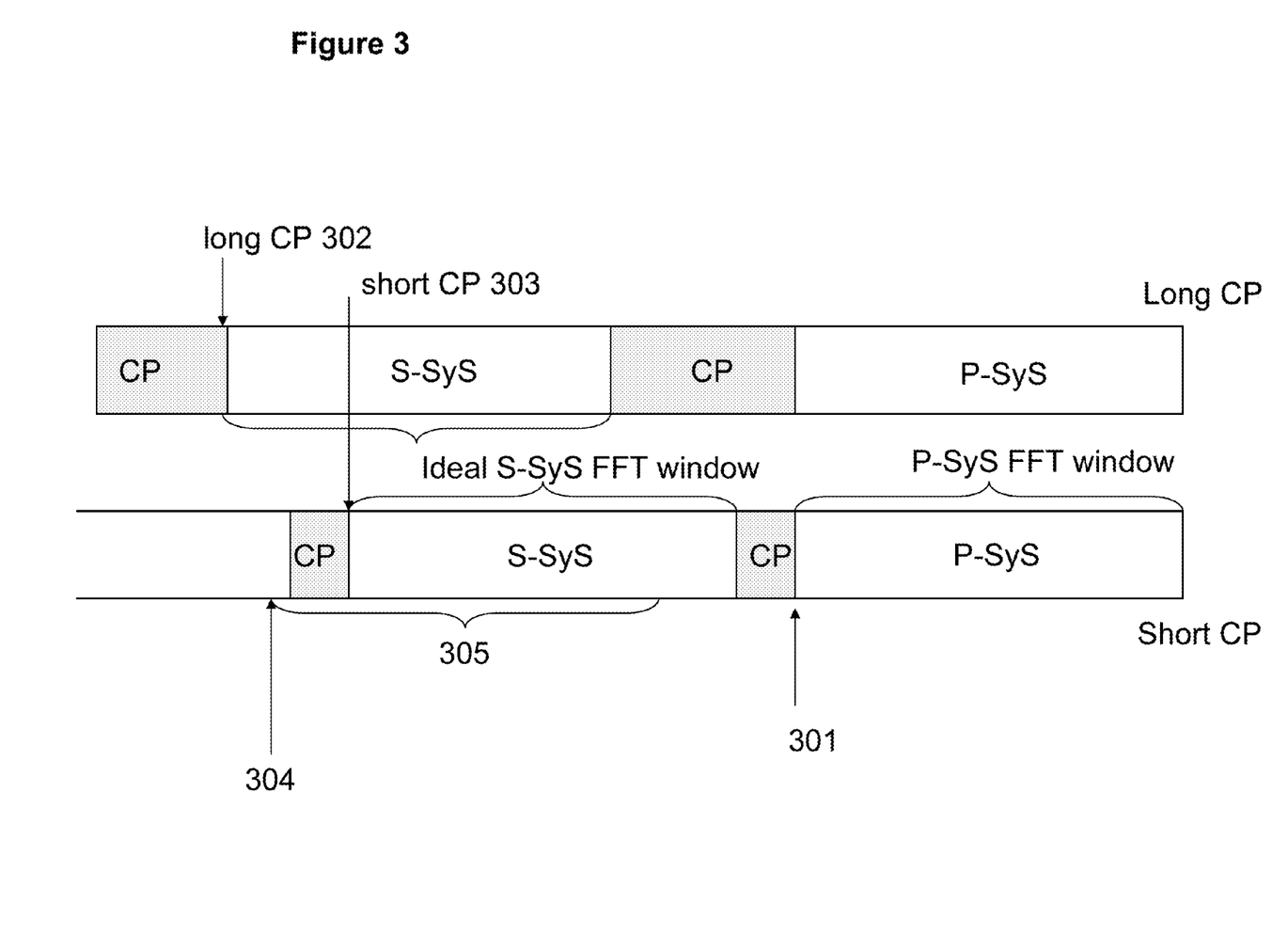
FIG. 3 illustrates, in detail, the SyS timing relationships for the long CP and short CP, with an overlay of the S-SyS FFT timing used by the present invention.

In FIG. 3, the SyS timing relationships for the long CP and short CP are shown in more detail, together with an illustration of the S-SyS FFT timing 305 used in the present invention. As noted, first the apparatus correlates the P-SyS signals to the received signal in order to find the P-SyS sequence as well as P-SyS signal timing (providing 5 ms timing information). Ideally, the time instant 301 is detected, however due to, inter alia, noise, the correct timing might not be found, e.g., a chip could differ. Nevertheless, it is assumed that perfect timing is determined. The apparatus does not know if the cell has a long CP or short CP, hence either of the cases 302 or 303 is possible. The apparatus does have knowledge of the correct timing, subject to determination of there being a long CP 302 or short CP 303. Hence, in principle, the apparatus could set an FFT window on both places, perform two FFT operations and then perform the S-SyS detection to find the best match. However, such an operation requires two FFT operations, whereas the present invention only requires one FFT operation. As noted, the present invention is adapted to have an FFT time instant in between 302 and 303, shown in FIG. 3 as 304. The timing position is preferably chosen in the middle between 302 and 303 so as to introduce equal phase shift for the two cases, but the present invention is not limited to that case. A further embodiment of the present invention is to place the window based on the probabilities of short and long CP. If the probability is larger for a shorter CP the FFT-window is placed more to the right and vice versa. The benefit of this is less noise is introduced due to ISI for the most probable CP length when performing the S-SyS detection. One way to determine the probability is based on the CP length of the NB cells.

As is known from FFT processing of OFDM symbols, a sampling error of $-n$ chips (relative ideal timing) gives a rotation of $-2\pi n/N_{FFT}$ radians between consecutive sub-carriers, where $N_{FFT}$ is the length of the FFT. The foregoing relationship is true as long as the sampling error is within the CP, and therefore, if n is known it can be perfectly compensated for in the detection process. As can be seen in FIG. 3, the FFT time instant 304 is outside the CP in both the long CP and short CP case, hence inter symbol interference (ISI) is introduced. The sampling time 304 introduces a sampling error in the order of 5-10% of the OFDM symbol length and such sampling error introduces distortion in the order of 7 to 8 dB signal to distortion ratio (SDR). However, the cell search is designed for detection in the range of a signal to noise ratio (SNR) of $-6$ to $0$ dB, i.e., scenarios where the noise is stronger than the signal. Hence, the SDR introduced due to ISI is a magnitude smaller than the SNR for a typical cell search scenario and therefore, this ISI only contributes a negligible part of the noise power.

Assume sampling at time instant 304 results in a $\pm n$ chip sampling error to the ideal timing in the long CP (+) and short CP (−) case. A mathematical model of the frequency domain received S-SyS symbol at sub-carrier k (where $N_{used}$ sub-carriers are used for S-SyS sequences) can now be written:

$$Y_k^{S\text{-}SyS} = e^{\pm j2\pi \cdot n \cdot k/N_{FFT}} H_k s_k + e_k + \epsilon_k^{ISI}, \ k=1, \ldots, N_{used} \quad (1)$$

where + is true if it is a long CP (positive), and − is true if it is a short CP (negative). The channel $H_i$ is estimated using the P-SyS as a phase reference and hence can be equalized, i.e. can determine the CP length as well as the cell group of the received S-SyS. Equalization can be accomplished using a variety of techniques. For example, and without limitation, the following steps can be used to perform the equalization:

$$\tilde{Y}_k^{S\text{-}SyS} = \frac{Y_k^{S\text{-}SyS}}{\hat{H}_k} \approx e^{\pm j2\pi \cdot n \cdot k/N_{FFT}} s_k + \tilde{e}_k \quad (2)$$

Now, two de-rotated versions, each version phase corrected with the phase shift corresponding to the long CP and short CP of the received S-SyS are generated and the two phase corrected versions are correlated to all possible M S-SyS sequences and the correlation giving the highest power is used to determine the CP length as well as the cell group. Mathematically speaking, the following steps are performed:

$$\tilde{Y}_k^{longCP} = e^{-j2\pi \cdot n \cdot k/N_{FFT}} \tilde{Y}_k^{S\text{-}SyS} \quad (3)$$

$$\tilde{Y}_k^{shortCP} = e^{j2\pi \cdot n \cdot k/N_{FFT}} \tilde{Y}_k^{S\text{-}SyS} \quad (4)$$

cell group, $$CP \text{ length} = \arg \max_{(long/short),m} \left| \sum_{k=1}^{N_{used}} (s_k^m) \cdot \left[ \tilde{Y}_k^{longCP}, \tilde{Y}_k^{shortCP} \right] \right|^2$$

$$m = 1 \ldots M \quad (5)$$

Figure 4:
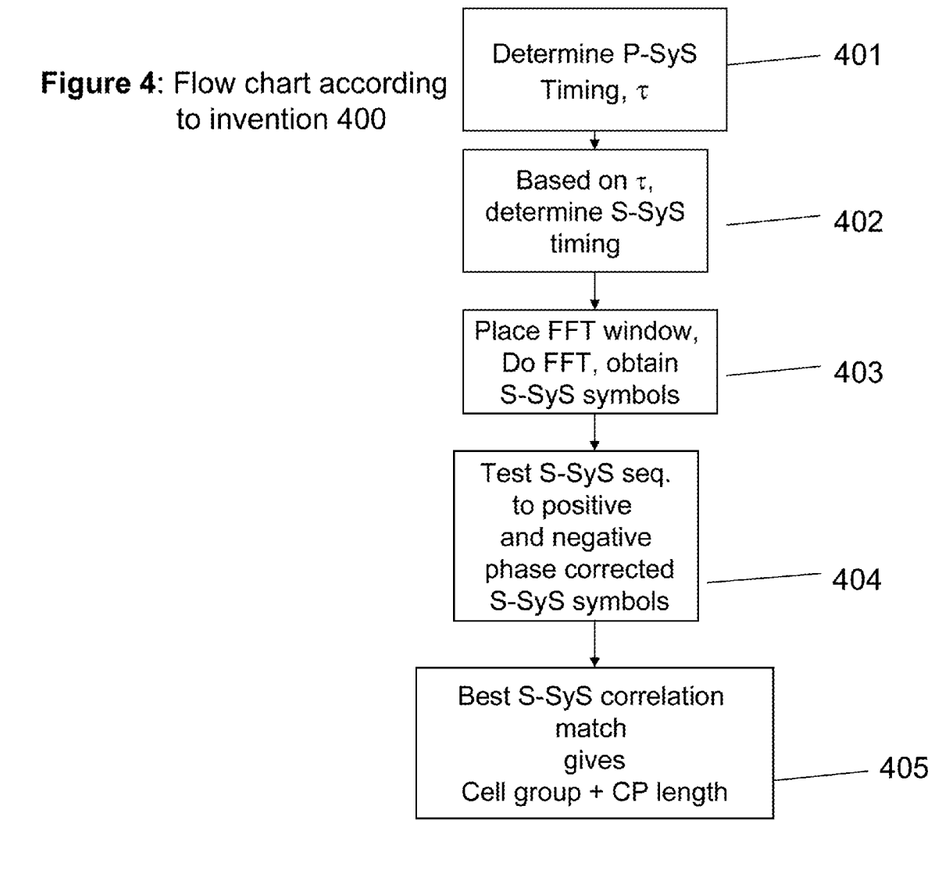
FIG. 4 provides a flowchart of the method of the present invention.

A flowchart 400 illustrating the method of the present invention is provided in FIG. 4. As seen therein, in step 401, the P-SyS timing τ is determined using the P-SyS, which corresponds to 301 of FIG. 3. In step 402, the S-SyS timing is determined, corresponding to 304 of FIG. 3. In step 403, the FFT window is placed and the signal is FFT processed to obtain the frequency domain S-SyS symbols. In step 404, the frequency domain S-SyS signal is equalized, for example in accordance with equation (2), and then phase corrected according to equations (3) and (4). In step 405, the cell group and CP length detected are given by the correlation giving maximum energy according to equation (5).

Figure 5:
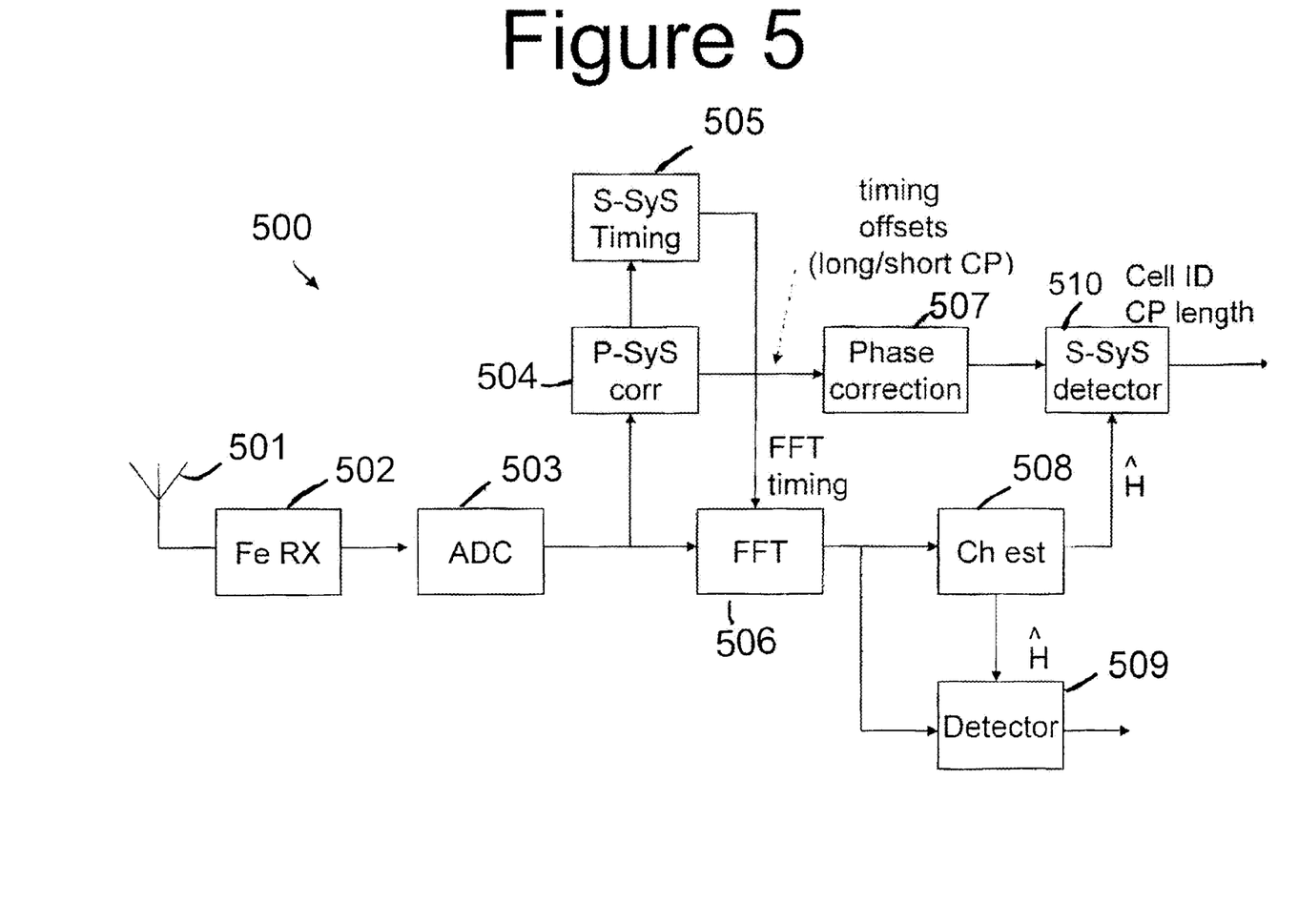
FIG. 5 is a block diagram of an apparatus adapted to implement the method of the present invention

An apparatus adapted to implement the method of the present invention is provided in FIG. 5. FIG. 5 is a high-level block diagram 500 of an apparatus of the present invention, comprising an antenna 501, front end receiver (Fe RX) 502, analog to digital converter (ADC) 503, P-SyS correlation module 504, S-SyS timing module 505, Fast Fourier Transform module 506, Phase correction module 507, channel estimation module 508, detector 509 and S-SyS detector 510. As seen therein, the apparatus, which may include a UE, is adapted to perform the following operations:

After signal is received at antenna 501 and demodulated at FE RX 502 it is converted into a digital signal at ADC 503.

The P-SyS timing τ is determined using the P-SyS, which corresponds to 301 of FIG. 3, at P-SYS correlation module 504.

The S-SyS timing is derived at S-SyS timing module 505, based on outcome from P-SyS, corresponding to 304 of FIG. 3. The FFT window is placed and the signal is FFT processed to obtain the frequency domain S-SyS symbols at FFT module 506. The frequency domain S-SyS signal is equalized, for example, in accordance with equation (2) and then phase corrected according to equations (3) and (4). The cell group and CP length detected are given by the correlation giving maximum energy according to equation (5) in S-SyS detector module 510. In channel estimation unit 508, the channel H is estimated. For S-SyS detection, the f-domain representation of the P-SyS is used as pilots for the channel estimation used for S-SyS equalization. Furthermore the reference symbols (pilots) are used to obtain the channel estimate used for data equalization and detection in detector 509.

Figure 6:
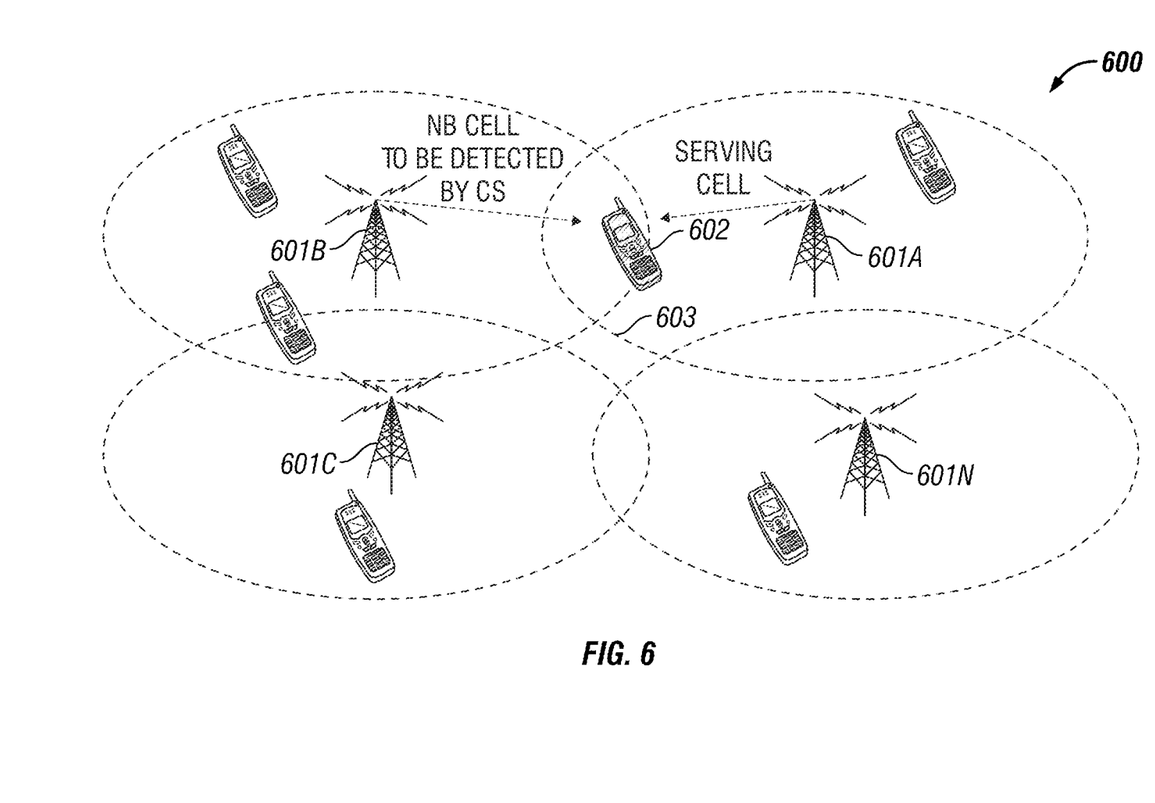
FIG. 6 illustrates a system in which the method of the present invention may be implemented.

FIG. 6 illustrates a wireless network 600 in which an apparatus according to the principles of the present invention may be used. Wireless network 600 comprises a plurality of cell sites 601A . . . 601N each containing a base station (BS) adapted to communicate with apparatus 602. Apparatus 602 may be any suitable wireless devices, including a UE, cellular radiotelephones, handset devices, personal digital assistants, portable computers, or metering devices. The present invention is not limited to mobile handsets. Other types of access terminals, including fixed wireless terminals, may be used. However, for the sake of simplicity, only UES are shown and discussed herein.

Dotted lines 603 show the approximate boundaries of the cell sites 601. The cell sites are shown approximately circular for the purposes of illustration and explanation only. It should be clearly understood that the cell sites often have other irregular shapes, depending on the cell configuration selected and natural and man-made obstructions.

As is well known in the art, cell sites 601 are comprised of a plurality of sectors (not shown), each sector being illuminated by a directional antenna coupled to the base station. The embodiment of FIG. 6 illustrates the base station in the center of the cell. Alternate embodiments position the directional antennas in corners of the sectors. The system of the present invention is not limited to any particular cell site configuration.

In the wireless network 600, apparatus 602 is located in cell sites 601A, 601B and is in communication with serving cell 601B. Apparatus 602 is also located close to the edge of cell site 601B. Apparatus 602 routinely performs cell searches to detect the base stations of a wireless network in the vicinity of the apparatus 602. Whenever an apparatus is turned on, an initial cell search is performed in order to search for and acquire at least one of the base stations of wireless network. Thereafter, the apparatus continues to perform cell searches in order to determine the strongest base station(s) in the vicinity and to identify available base stations to which the mobile station may be transferred in case it is necessary to perform a handoff. To improve the efficiency of these cell searches, the system of the present invention includes the apparatus of FIG. 5 in combination with wireless network.

There have been described and illustrated herein methods, apparatus, and systems to simultaneously determine the CP length and the cell group during the cell search by time adjusting the Fast Fourier Transform (FFT) window for the S-SyS. While particular embodiments of the present invention have been described, it is not intended that the present invention be limited thereto, as it is intended that the invention be as broad in scope as the art will allow and that the specification be read likewise. For example, the method can be used where there are more than two CP length hypotheses present. In such case, the phase de-rotation is proportional to the difference between the used sampling time instant and the ideal sampling instant for each respective CP length hypothesis. Then the steps described herein can be applied. Further, while the apparatus of the invention is shown in block diagram format, it will be appreciated that the block diagram may be representative of and implemented by hardware, software, firmware, or any combination thereof. Moreover, the functionality of certain aspects of the block diagram can be obtained by equivalent or suitable structure. For example, instead of an FFT, other Fourier transform means could be utilized. It will therefore be appreciated by those skilled in the art that yet other modifications could be made to the provided invention without deviating from its spirit and scope as claimed.

The invention claimed is:

1. A method in a radio receiver for simultaneously detecting a cell group and a cyclic prefix (CP) length in a Long Term Evolution (LTE) radio access network, the method comprising the steps of:
   determining a primary synchronization signal (P-SyS) timing;
   determining secondary synchronization signal (S-SyS) timings for a long CP and a short CP from the determined P-SyS timing;
   placing a single Fast Fourier Transform (FFT) window for the S-SyS between the determined timings for the long CP and the short CP and performing an FFT to obtain a frequency domain transformed S-SyS;
   performing a first phase shift of the frequency domain transformed S-SyS for the long CP to generate a first version of a phase shifted frequency domain transformed S-SyS;
   performing a second phase shift of the frequency domain transformed S-SyS for the short CP to generate a second version of the phase shifted frequency domain transformed S-SyS;
   correlating all S-SyS sequences that can occur in the LTE network to both the first and second phase shifted versions of the frequency domain transformed S-SyS; and
   detecting a correlation between one of the S-SyS sequences and the phase shifted versions of the frequency domain transformed S-SyS that provides maximum energy, thereby determining the cell group and the CP length.

2. The method recited in claim 1, wherein an appropriate timing position is in the middle between the timing for the long CP and timing for the short CP.

3. The method recited in claim 1, wherein the first phase shift is a positive phase shift and the second phase shift is a negative phase shift.

4. A radio receiver for simultaneously detecting a cell group and a cyclic prefix (CP) length in a Long Term Evolution (LTE) radio access network, the receiver comprising:
   cell search means for determining a primary synchronization signal (P-SyS) timing;
   cell search means for determining a secondary synchronization signal (S-SyS) timing for a long CP and a short CP from the determined P-SyS timing;
   means for placing a single Fast Fourier Transform (FFT) window between the timing for the long CP and the short CP and for performing an FFT to obtain a frequency domain transformed S-SyS;

means for performing a first phase shift of the frequency domain transformed S-SyS for the long CP to generate a first version of a phase shifted frequency domain transformed S-SyS;

means for performing a second phase shift of the frequency domain transformed S-SyS for the short CP to generate a second version of the phase shifted frequency domain transformed S-SyS;

means for correlating all S-SyS sequences that can occur in the LTE network to both the first and second phase shifted versions of the frequency domain transformed S-SyS; and means for detecting a correlation between one of the S-SyS sequences and the phase shifted versions of the frequency domain transformed S-SyS that provides maximum energy, thereby determining the cell group and the CP length.

* * * * *

UNITED STATES PATENT AND TRADEMARK OFFICE
CERTIFICATE OF CORRECTION

| | |
|---|---|
| PATENT NO. | : 8,576,869 B2 |
| APPLICATION NO. | : 12/970306 |
| DATED | : November 5, 2013 |
| INVENTOR(S) | : Wilhelmsson et al. |

It is certified that error appears in the above-identified patent and that said Letters Patent is hereby corrected as shown below:

On the Title Page, in Item [63], Under "Related U.S. Application Data", in Column 1, Line 2, delete "Dec. 2, 2007," and insert -- Dec. 20, 2007, --, therefor.

In the Specification

Column 1, Line 11, delete "Dec. 2, 2007," and insert -- Dec. 20, 2007, --, therefor.

Column 1, Line 18, delete "an" and insert -- and --, therefor.

Column 1, Line 63, delete "information" and insert -- information. --, therefor.

Column 1, Line 65, delete "prefic" and insert -- prefix --, therefor.

Column 2, Line 17, delete "a asynchronus" and insert -- an asynchronous --, therefor.

Column 2, Line 50, delete "invention" and insert -- invention; --, therefor.

Column 4, Lines 21-22, in Equation (2), delete "$\tilde{Y}_k^{S-SyS} = \frac{Y_k^{S-SyS}}{\hat{H}_k} \approx e^{\pm j2\pi \cdot n \cdot k/N_{FFT}} s_k + \tilde{e}_k$" and insert -- $\tilde{Y}_k^{S-SyS} = \frac{Y_k^{S-SyS}}{\hat{H}_k} \approx e^{\pm j2\pi \cdot n \cdot k/N_{FFT}} s_k + \tilde{e}_k$ --, therefor.

Column 4, Line 67, delete "FE RX 502" and insert -- Fe RX 502 --, therefor.

Column 5, Line 2, delete "P-SYS" and insert -- P-SyS --, therefor.

Column 5, Line 29, delete "UES" and insert -- UEs --, therefor.

Signed and Sealed this
Fifteenth Day of July, 2014

Michelle K. Lee
*Deputy Director of the United States Patent and Trademark Office*